(12) United States Patent
Jung (10) Patent No.: US 9,948,616 B2
(45) Date of Patent: Apr. 17, 2018

(54) APPARATUS AND METHOD FOR PROVIDING SECURITY SERVICE BASED ON VIRTUALIZATION

(71) Applicant: ELECTRONICS AND TELECOMMUNICATIONS RESEARCH INSTITUTE, Daejeon-si (KR)

(72) Inventor: Young Woo Jung, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 212 days.

(21) Appl. No.: 15/092,744

(22) Filed: Apr. 7, 2016

(65) Prior Publication Data

US 2016/0366130 A1    Dec. 15, 2016

(30) Foreign Application Priority Data

Feb. 10, 2015 (KR) .................. 10-2015-0020338

(51) Int. Cl.
*H04L 29/06* (2006.01)
*G06F 12/14* (2006.01)
*G06F 9/455* (2018.01)

(52) U.S. Cl.
CPC ...... *H04L 63/0428* (2013.01); *G06F 9/45558* (2013.01); *H04L 63/08* (2013.01);
(Continued)

(58) Field of Classification Search
CPC .................................................. H04L 63/0428
(Continued)

(56) References Cited

U.S. PATENT DOCUMENTS

2009/0163175 A1    6/2009  Shi et al.
2013/0042297 A1    2/2013  Kim et al.
(Continued)

FOREIGN PATENT DOCUMENTS

KR    10-2011-0061799 A    6/2011
KR    10-2013-0109560 A    10/2013
KR    10-2015-0092890 A    8/2015

OTHER PUBLICATIONS

Young-Woo Jung, Hag-Young Kim, Sang-Wook Kim, "An Architecture for Virtualization-Based Trusted Execution Environment on Mobile Devices", 978-1-4799-7646-1/14, IEEE 2014, Dec. 9-12, 2014.

*Primary Examiner* — Longbit Chai
(74) *Attorney, Agent, or Firm* — LRK Patent Law Firm (57) ABSTRACT

An apparatus for providing security services based on virtualization, the apparatus including: a host virtual machine in which a host operating system that controls a general execution environment is operated; a secure virtual machine, which is separated from the host virtual machine, and in which a secure operating system operates independently of the host operating system; and a virtual machine monitor portion configured to allocate the host virtual machine and the secure virtual machine by virtualization, in which the host virtual machine and the secure virtual machine may access system resources only through the virtual machine monitor portion, and the virtual machine monitor portion classifies user input signals received from a user, and transmits the received user input signals to the host virtual machine and the secure virtual machine.

17 Claims, 6 Drawing Sheets

(52) U.S. Cl.
CPC .............. *G06F 12/1408* (2013.01); *G06F 2009/45587* (2013.01); *G06F 2212/1052* (2013.01); *G06F 2212/152* (2013.01)

(58) Field of Classification Search
USPC ....................................................... 713/169
See application file for complete search history.

(56) References Cited

U.S. PATENT DOCUMENTS

| | | |
|---|---|---|
| 2014/0033266 A1 | 1/2014 | Kim et al. |
| 2015/0220709 A1 | 8/2015 | Jung et al. |
| 2016/0182567 A1* | 6/2016 | Sood ................. H04L 63/20 726/1 |

* cited by examiner

APPARATUS AND METHOD FOR PROVIDING SECURITY SERVICE BASED ON VIRTUALIZATION

CROSS-REFERENCE TO RELATED APPLICATION(S)

This application claims priority from Korean Patent Application No. 10-2015-0020338, filed on Feb. 10, 2015, in the Korean Intellectual Property Office, the entire disclosure of which is incorporated herein by reference for all purposes.

BACKGROUND

1. Field

The following description generally relates to system security technology, and more particularly to a technology for providing security services using virtualization.

2. Description of the Related Art

With the development of digital technology, security sensitive services, such as Internet financial services, mobile payment services, or remote diagnosis services, may be provided anywhere at any time via PCs or smart devices. As services that may be provided through PCs or smart devices are increased, and more and more important personal information are stored in these devices, relevant security technologies are also being developed rapidly. In such security services, important data, such as passwords and card information, is input through an application that is executed in a general operating system (OS), and important information is encrypted for transmission and reception.

In such environment, the general OS or other applications that are executed in the general OS may have easy access to security data that has been stored, and may easily obtain security data that has been input by a user. Accordingly, in the case where a user terminal is hacked into or is infected with a malicious code, information associated with encryption and secure data input by a user may be easily leaked to the outside. In order to solve this problem, security technology that stores secure data in a separate secure area has been developed, but a secure application, which processes secure data or a user's input and output, is still executed in the general OS, such that security vulnerabilities may not be addressed. Korean Laid-open Patent Publication No. 10-2013-0109560 discloses a technology for resolving such security vulnerabilities, but leakage from the general OS may not be resolved.

SUMMARY

Provided is an apparatus and method for providing security services based on virtualization, in which damage or leakage of security sensitive data, which may occur due to security vulnerabilities of the OS, may be prevented by using a virtualization technique that enables operating systems to be completely isolated from each other.

In one general aspect, there is provided an apparatus for providing security services based on virtualization, the apparatus including: a host virtual machine in which a host operating system that controls a general execution environment is operated; a secure virtual machine, which is separated from the host virtual machine, and in which a secure operating system operates independently of the host operating system; and a virtual machine monitor portion configured to allocate the host virtual machine and the secure virtual machine by virtualization. The host virtual machine and the secure virtual machine may access system resources only through the virtual machine monitor portion. The virtual machine monitor portion may classify user input signals received from a user, and may transmit the received user input signals to the host virtual machine and the secure virtual machine. Further, based on whether a secure application of the secure virtual machine is executed or whether a user input is transmitted from the secure application, the virtual machine monitor portion may transmit the user input signals only to the secure virtual machine.

Upon receiving a security service request from the host virtual machine, the secure virtual machine may execute the secure application that requires security and authentication, and may encrypt data to transmit the encrypted data to the host virtual machine through the virtual machine monitor portion. The host virtual machine may transmit the encrypted data, received through the virtual machine monitor portion, to a security service server that provides security services. In this manner, the secure virtual machine may execute the secure application in the secure operating system independently of the host operating system, and may transmit the encrypted data to an external network through the virtual machine monitor portion and the host virtual machine.

In the general execution environment where no security service is required, the virtual machine monitor portion may convert a state of the secure virtual machine into an idle state, and upon receiving a security service request from the host virtual machine, the virtual machine monitor portion may activate the secure virtual machine. Further, the virtual machine monitor portion may divide a physical memory area into a host physical memory area and a secure physical memory area, and may allocate the divided memory areas, in which the host operating system may map a host virtual memory into the host physical memory area, and the secure operating system may map a secure virtual memory into the secure physical memory area. The host operating system and the secure operating system may map user output signals of the host virtual memory and the secure virtual memory into the host physical memory area and the secure physical memory area respectively, in which the virtual machine monitor portion may transmit the user output signals, which are mapped into the host physical memory area and the secure physical memory area, to a user output device.

In another general aspect, there is provided a method of providing security services by using a host virtual machine and a secure virtual machine where different operating systems operate. First, upon receiving a security service request from the host virtual machine, the virtual machine monitor portion may activate the secure virtual machine that is in an idle state. Then, the activated secure virtual machine may perform mutual authentication with a security service server that provides the security services, and may execute the secure virtual machine. Based on whether the secure application is executed, the virtual machine monitor portion may transmit a received user input signal to the secure virtual machine. Upon receiving the user input signal, the secure virtual machine may encrypt data, and may transmit the encrypted data to the security service server through the virtual machine monitor portion and then the host virtual machine. Once the security service ends, the virtual machine monitor portion converts the state of the secure virtual machine into the idle state.

In a case where the secure application is executed, and the received user input signal is transmitted from the secure application, the virtual machine monitor portion may transmit the received user input signal to the secure virtual machine, and in a case where the secure application is not executed, or the received user input signal is not transmitted from the secure application, the virtual machine monitor portion may transmit the received user input signal to the host virtual machine.

DETAILED DESCRIPTION

Hereinafter, the present disclosure will be described in detail with reference to the accompanying drawings. Terms used throughout this specification are defined in consideration of functions according to exemplary embodiments, and can be varied according to a purpose of a user or manager, or precedent and so on. Thus, the meanings of the terms used in the following embodiments shall follow the definitions if defined herein, otherwise shall have the same meaning as is commonly understood by one of skill in the art to which this invention belongs.

Figure 1:
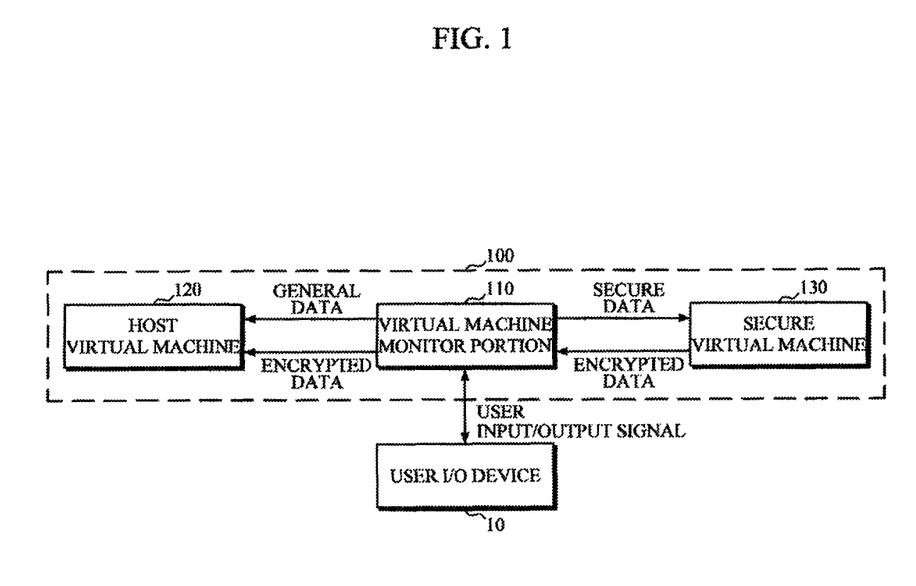
FIG. 1 is a block diagram illustrating an apparatus for providing security services based on virtualization according to an embodiment.

FIG. 1 is a block diagram illustrating an apparatus for providing security services based on virtualization according to an embodiment.

Referring to FIG. 1, the apparatus 100 for providing security services based on virtualization includes a virtual machine monitor portion 110, a host virtual machine 120, and a secure virtual machine 130. Further, the apparatus 100 for providing security services based on virtualization is one of hardware resources of a terminal, and may be configured as an input/output (I/O) device which includes hardware, such as a processor, a memory, a display device, a communication module, and the like.

The virtual machine monitor 110 supports virtualization to operate different operating systems in their respective virtual machine portions 110 and 120. The virtual machine monitor portion 110 virtualizes hardware resources and allocates the virtualized hardware resources to the host virtual machine 120 and the secure virtual machine 130. The virtual machine monitor portion 110 allocates two or more virtual machines by virtualization, and operates two or more operating systems (OSes) through different virtual machines. Further, the virtual machine monitor portion 110 may use a layer such as a virtual machine monitor or a hypervisor. In addition, the virtual machine monitor portion 110 may have a higher-level control than a Supervisor or Kernel of the OS, may block direct connection of the host virtual machine 120 and the secure virtual machine 130 with system hardware, and may isolate the two virtual machines 120 and 130 from each other.

The virtual machine monitor portion 110 may classify a user's input and output (I/O) signals received from a user through a user I/O device 10, and transmits the classified I/O signals to the host virtual machine 120 and the secure virtual machine 130. The user I/O device 10 is a device to receive inputs from a user, and examples thereof include a keypad, a touch screen interface, and physical inputs of a mobile terminal. General data refers to data that does not requires security among I/O signals input by a user through various applications. For example, general data refers to signals that include search words of a web browser, messages, and inputs for various manipulations, and refers to most signals that do not require specific security or authentication. Secure data refers to data that is input through secure applications requiring security or authentication, and security sensitive data. For example, secure data may include information, such as personal information, passwords, and card information input through financial applications. The virtual machine monitor portion 110 may classify data according to focusing of the received user I/O signals into general data and secure data, and may transmit the general data to the host virtual machine 120 and the secure data to the secure virtual machine 130. Further, the virtual machine monitor portion 110 may classify user I/O signals into the general data and secure data according to an activation state of the secure virtual machine 130 or a secure application being executed, and may transmit the general data and the secure data to the host virtual machine 120 and the secure virtual machine 130.

The virtual machine monitor portion 110 may classify the received data into general data and secure data, and may transmit the general data to the host virtual machine 120 and the secure data to the secure virtual machine 130. Further, a secure operating system of the secure virtual machine 130 uses a network device provided by a host operating system of the host virtual machine 120, so as to communicate with an external network to transmit and receive encrypted data. That is, the secure virtual machine 130 is not directly connected with an external network, and may only be connected with an external network through the host virtual machine 120, which is connected with the external network, by a communication method of the virtual machine monitor portion 110.

Further, the virtual machine monitor portion 110 may use a virtual machine scheduling method to variably adjust an execution environment where the host operating system operates and an execution environment where the secure operating system operates. In this manner, the virtual machine monitor portion 110 may minimize deterioration of system performance while achieving security and efficiency. The virtual machine scheduling method will be described in detail with reference to FIG. 3.

The host operating system operates in the host virtual machine 120, in which the host operating system controls a general execution environment to store the general data and provides an execution environment of the general application. The general data and general application refer to general data files and applications that do not require any specific security and authentication. That is, the host operating system of the host virtual machine 120 may generally serve as an operating system to operate a mobile terminal or a PC. Since the host operating system receives virtualized system resources through the virtual machine monitor portion 110, the host operating system may not access the secure operating system of the virtual machine monitor portion 110 and the secure virtual machine 130. Further, the host virtual machine 120 includes a general device driver such as network and storage devices, under the host OS kernel, a driver for virtual I/O devices that are classified and transmitted by the virtual machine monitor portion 110, and a client communication agent that provides communication of encrypted data.

A secure OS is operated in the secure virtual machine 130, in which the secure OS stores secure data, and provides an execution environment of secure applications. The secure OS is separated from the host OS of the host virtual machine 120, and operates independently to drive the secure virtual machine 130. Further, the secure data refers to confidential data, such as a user's personal information, password, and card information, which requires security, and secure applications refer to applications, such as applications related to financial and payment services, so which use secure data. The secure applications are executed in the secure virtual machine 130 that is a virtualized secure area in a terminal, in which the secure applications process credential information, an encryption key, and a user's input used for financial or payment services that require security and authentication. Here, the credential information is cryptographic personal information used in an information system, and examples thereof may include: a public key used by a user, a pair of public and private keys for an encryption algorithm, a public key certificate signed by a certificate authority (CA), information associated with a trusted root certificate authority (e.g., KISA root certification authority), a password, applied information, and the like.

Further, the secure virtual machine 130 is not connected to a network device to provide secure environment from the outside and may communicate with external devices only through the virtual machine monitor portion 110 via a network device of the host virtual machine 120. The secure virtual machine 130 performs mutual authentication via authentication modules by using credential information stored in the secure OS, and transmits encrypted data to the virtual monitor portion 110. The virtual monitor portion 110 may transmit the encrypted data, received from the secure virtual machine 130, to a server connected with a secure application through network device of the host virtual machine 120. While data transmission and reception with an external network may be performed through a network device of the host OS in the host virtual machine 120, the host OS may receive and view only the data encrypted via an encryption key, such that data stability may be secured. The security procedure of the apparatus 100 for providing security services based on virtualization will be further described later with reference to FIG. 4.

As described above, the virtual machine monitor portion 110 separates the secure virtual machine 130 from the host virtual machine 120, which provides complete isolation. The host virtual machine 120 and the secure virtual machine 130, which are virtual machines generated by virtualization, may not directly access system resources, and are separated from each other, such that the host virtual machine 120 and the secure virtual machine 130 may not be directly connected with each other. Further, user input and output received through secure applications or user input and output that includes secure data is transmitted only to the secure virtual machine 130 via the virtual machine monitor portion 110. For this reason, the host OS of the host virtual machine 120 and general applications executed in the host OS may not have access to the user input and output received through secure applications. Accordingly, the secure operating system may not be accessed directly by an external network, such that the secure OS may be safely protected from hacking and malicious codes.

Figure 2:
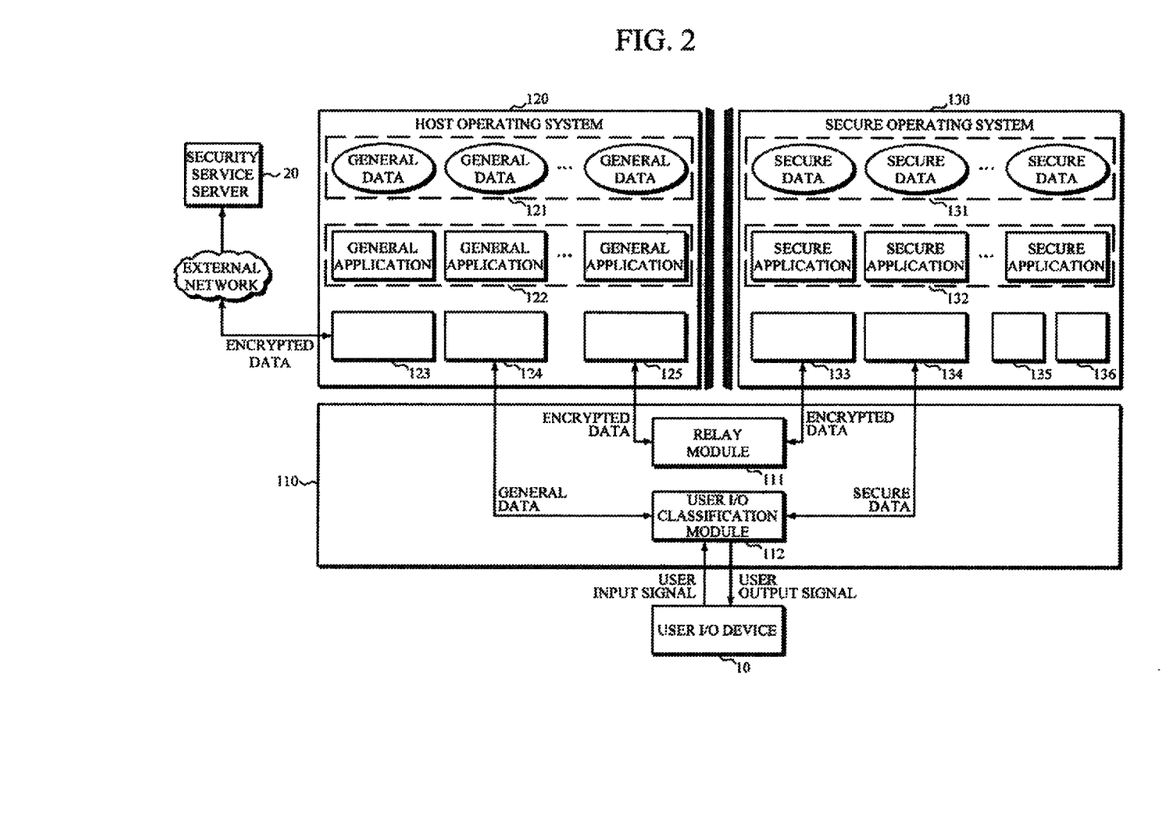
FIG. 2 is a detailed diagram illustrating an apparatus for providing security services based on virtualization according to an embodiment.

FIG. 2 is a detailed diagram illustrating an apparatus 100 for providing security services based on virtualization according to an embodiment.

Referring to FIGS. 1 and 2, the virtual machine monitor portion 110 may apply virtualization technology to system resources and may allocate the resources to the host virtual machine 120 and the secure virtual machine 130. The virtual machine monitor portion 110 has a higher-level control than a management program or Kernel of the OS, may block direct connection of the host virtual machine 120 and the secure virtual machine 130 with system hardware, and may isolate the two virtual machines 120 and 130 from each other.

The host virtual machine 120 is operated by the host OS which is a generally used operating system. Further, the host virtual machine 120 stores one or more general data 121 under the host operating system, and executes one or more general applications 122. The general data 121 is data that does not require security, and may include most general data. The general application 122 is an application that does not require security, and may include most applications, other than applications, such as a financial application, which require security. The host virtual machine 120 includes: a network module 123 for connection with an external network under a host OS kernel; a driver 124 for a virtual user I/O device which is classified and transmitted by the virtual machine monitor portion 110; and a client communication agent 125 that performs transmission and reception of encrypted data.

The secure virtual machine 130 is operated by a secure operating system that stores secure data 131 and executes a secure application 132. The secure data 131 is data that requires security, and may include a password used for security and authentication procedures, important personal information, card information associated financial services, and the like. Further, the secure application 131 is an application that requires security, and examples thereof may include an application that provides financial services, an application that requires authentication, an application that requires important personal information, and the like. In addition, the secure virtual machine 130 includes: a server communication agent 133 for encrypted communication with an external service provider under a secure OS kernel; a driver 134 for a virtual user I/O device which is classified and transmitted by the virtual machine monitor portion 110; an authentication module 135 that performs authentication; and an encryption module 136 that performs encryption.

A user generally executes the general application 122 of the host virtual machine 120 to use a terminal. If a user requests to start a security service by using the general application 122 that is executed in the host operating system, the secure virtual machine 130 executes a security session, in which the secure OS of the secure virtual machine 130 executes the secure application. Before executing the secure application 132, the secure virtual machine 130 may perform authentication by using the authentication module 135.

A user transmits user input signals by using an input device included in the user I/O device 10. The input device includes a general input device, such as a keyboard and a mouse that are used as input device of a PC, and a touch-screen interface of a mobile terminal. The user I/O classification module 112 of the virtual machine monitor portion 110 classifies the user input signals into general data or secure data. The virtual machine monitor portion 110 transmits the user input signals to the host virtual machine 120 or the secure virtual machine 130 according to focusing of the received user input signals. Alternatively, the user I/O classification module 112 may classify the user input signals according to activation state of the secure operating system in the secure virtual machine 130. The secure data, classified in this manner, is transmitted to the driver 134 for a virtual user I/O device of the secure virtual machine 130. The user input signals classified as the secure data may be information, such as a password or card information, which requires security.

In the secure virtual machine 130, the authentication module 135 performs authentication based on the received secure data, and may encrypt data to be transmitted to a security service server 20 by using the encryption module 136 to generate encrypted data. The security service server 20 is a server connected with the secure application 132 that has been executed, and may be, for example, a server of a financial firm in the case of a financial application. The security service server 20 is merely illustrative for convenience of explanation, and the server is not limited to a specific server but may also include all types of servers to which the secure application 132 may be connected.

The secure virtual machine 130 transmits data, output by the secure application 132, to the user I/O classification module 112 of the virtual machine monitor portion 110 through the driver 134 for the virtual user I/O device. Further, the virtual machine monitor portion 110 transmits the user output signals by using an output device included in the user I/O device 10. The output device included in the user I/O device 10 includes a display device and a voice reproduction device, and may include a device that provides execution results of secure applications to a user or a device that provides a specific interface to a user. For example, the user output signals may be an interface screen for password input of a bank application which is the secure application 132, or processing results of bank services in response to a user's request. The output device may be a monitor that displays such results, or a display screen of a mobile terminal.

The secure virtual machine 130 transmits data, encrypted by the encryption module 136, to the relay module 111 of the virtual machine monitor portion 110 through a server communication agent 133. The relay module 111 of the virtual machine monitor portion 110 transmits the encrypted data to the client communication agent 125 of the host virtual machine 120, and is connected to an external network through the network module 123 to transmit the encrypted data to the security service server 20. The encrypted data, transmitted from the security service server 20, is then transmitted to the secure virtual machine 130 through the host virtual machine 120 and the virtual machine monitor portion 110.

As described above, in the apparatus 100 for providing security services based on virtualization, the host virtual machine 120, where the host OS is operated, and the secure virtual machine 130, where the secure operating system is operated, are allocated and isolated from each other by the virtual machine monitor portion 110, such that only the virtual machine monitor portion 110 may exchange data between the host virtual machine 120 and the secure virtual machine 130. User input and output signals are classified into secure data and general data, in which the secure data is not transmitted to the host virtual machine 120 but is transmitted only to the secure virtual machine 130, such that the general application 122 may not access the secure data.

Further, while the secure virtual machine 130 performs data transmission and reception with an external network through the network module 123 of the host virtual machine 120, the host operating system may only receive and view data encrypted with an encryption key, thereby ensuring stability of data. In this manner, the secure operating system may not be accessed directly by an external network, such that the secure operating system may be safely protected from hacking and malicious codes.

Figure 3:
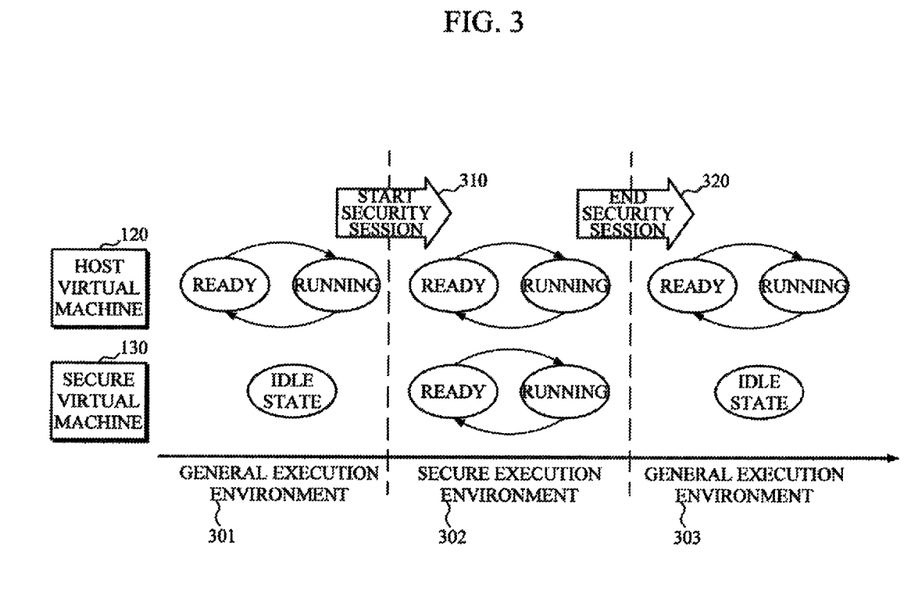
FIG. 3 is a diagram illustrating a virtual machine scheduling method performed by the apparatus for providing security services based on virtualization according to an embodiment.

FIG. 3 is a diagram illustrating a virtual machine scheduling method performed by the apparatus for providing security services based on virtualization according to an embodiment.

As illustrated in FIG. 3, the virtual machine monitor portion 110 of the apparatus 100 for providing security services based on virtualization may use a virtual machine scheduling method to variably adjust an execution environment of the host virtual machine 120 where the host operating system operates and an execution environment of the secure virtual machine 130 where the secure operating system operates, so that system load may be reduced, and performance deterioration may be reduced.

In a general execution environment 301 where the secure application is not executed, the virtual machine monitor portion 110 maintains the host virtual machine 120 in an activated state, and converts the secure virtual machine 130 in an idle state. In the general execution environment 301, the host operating system of the host virtual machine 120 may be alternately in a ready state or a running state to execute a user terminal. However, a secure application is not executed in the general execution environment 301, such that the secure virtual machine 130 is not required to be scheduled, and waits in an idle state.

Upon starting a security session in 310, the general execution environment 301 is changed to a secure execution environment in 302, and the secure operating system is required to be scheduled, such that the virtual machine monitor portion 110 activates the secure virtual machine 130 that has been waiting in an idle state. In the secure execution environment in 302, the secure virtual machine 130 is activated by the virtual machine monitor portion 110 so that the secure virtual machine 130 may be alternately in a ready state and in a running state, in the same manner as the host virtual machine 120. Since the host virtual machine 120 operates a user terminal regardless of an execution environment, the host virtual machine 120, while being activated all the time, is alternately in a ready state or in a running state. If the secure session ends, and the secure execution environment in 302 is changed to the general execution environment in 303, the virtual machine monitor portion 110 returns the state of the secure virtual machine 130 to an idle state. In this manner, the virtual machine monitor portion 110 may perform scheduling of the host virtual machine 120 and the secure virtual machine 130 in the same environment as the general execution environment in 301, which is an environment before the secure session.

As described above, by the scheduling of the virtual machine monitor portion 110, the apparatus 100 for providing security services based on virtualization may operate the secure virtual machine 130 only when it's necessary, thereby reducing system load, and minimizing performance deterioration.

Figure 4:
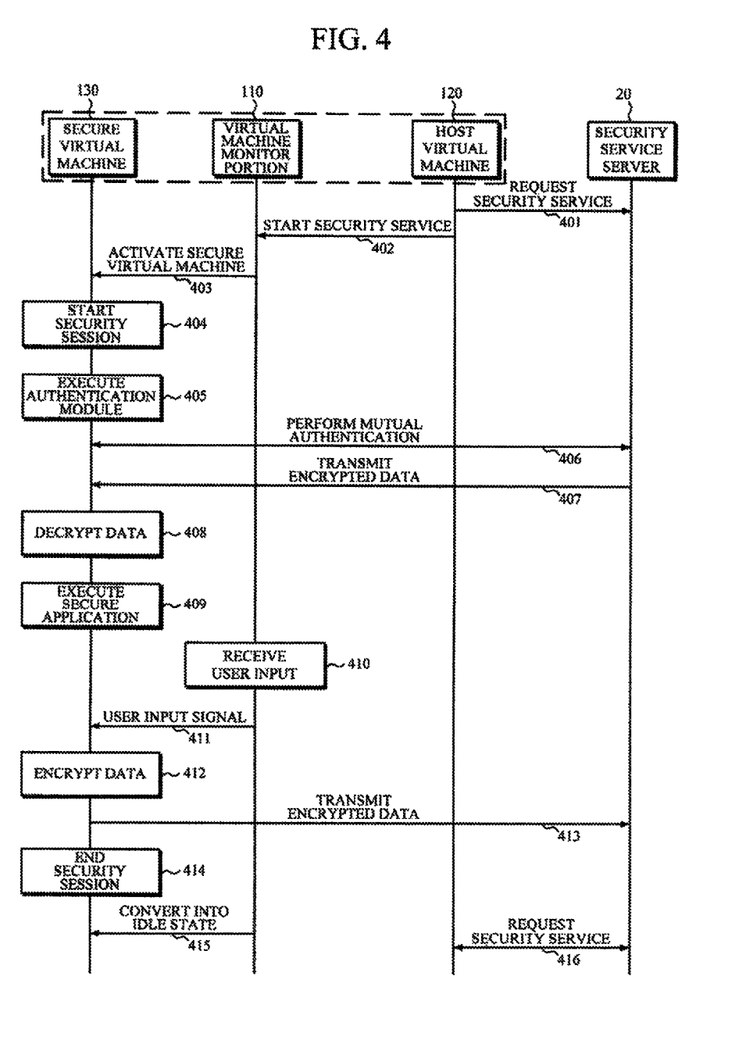
FIG. 4 is a flowchart illustrating a method of providing security services by the apparatus for providing security services based on virtualization according to an embodiment.

FIG. 4 is a flowchart illustrating a method of providing security services by the apparatus 100 for providing security services based on virtualization according to an embodiment.

Referring to FIG. 4, in response to a user's request, the host virtual machine 120 transmits a request to start a security service to the security service server 20 in 401 by using a general application executed in the host operating system. Then, the host virtual machine 120 notifies the virtual machine monitor portion 110 of the start of the security service in 402. In the general execution environment, the secure virtual machine 130 waits in an idle state, and only the host operating system of the host virtual machine 120 operates. Once a user requests a security service through a general application, the host virtual machine 120 transmits a security service request to the security service server 20 by using a network module, and at the same time notifies the virtual machine monitor portion 110 of the start of a security service. The security service server 20 provides security services requested by a user, and may be, for example, a bank security server for bank services.

Upon receiving the notification of the start of a security service from the host virtual machine 120 notifies, the virtual machine monitor portion 110 activates the secure virtual machine 130, which has been waiting in an idle state, in 403. In the general execution environment, the secure virtual machine 130 waits in an idle state to prevent performance deterioration. Upon the start of the security service, the virtual machine monitor portion 110 activates the secure virtual machine 130 by scheduling and changes the secure virtual machine 130 to a secure execution environment, so that the secure virtual machine 130 may be alternately in a ready state and in a running state, in the same manner as the host virtual machine 120.

The secure virtual machine 130, activated by the virtual machine monitor portion 110, starts a security session in 404, and executes an authentication module in 405 to perform mutual authentication with the security service server 20. In this case, in order to perform mutual authentication with the security service server by using the authentication module the secure virtual machine, the secure virtual machine 130 is not directly connected with the security service server 20, but is connected with the security service server 20 through the virtual machine monitor portion 110 and the host virtual machine 120. The secure operating system of the secure virtual machine 130 uses credential information to transmit authentication information, authenticated through an authentication module, to the security service server 20, and receives encrypted authentication information from the security service server 20 to perform authentication. In reverse order to the transmission of the authentication information, this process is performed through the host virtual machine 120 and the virtual machine monitor portion 110.

Once the security service server 20 transmits the encrypted data to the secure virtual machine 130 through the host virtual machine 120 and the virtual machine monitor portion 110 in 407, the secure virtual machine 130 decrypts the encrypted data by using an encryption module in 408. Then, the secure virtual machine 130 executes a secure application in a secure execution environment in 409. Once the secure application is executed to transmit a user input signal input by a user with an input device, the virtual machine monitor portion 110 receives the user input signal in 410. Then, the virtual machine monitor portion 110 determines the user input signal, which has been received while the secure application is executed, to be secure data, and transmits the received user input signal to the secure virtual machine 130 in 411. The processing of the user input signal by the virtual machine monitor portion 110 will be further described later with reference to FIG. 5.

Upon receiving the user input signal from the virtual machine monitor portion 110, the secure virtual machine 130 encrypts data by using an encryption module, and generates encrypted data. The user input signal, input from a user while the secure application is executed (secure execution state), is directly transmitted to the secure virtual machine 130 without passing through the host virtual machine 120. The user input signal may include information, such as a password, personal information, and card information, which requires security. Such information is encrypted by the secure virtual machine 130 and is transmitted to the security service server 20 through the virtual machine monitor portion 110 and the host virtual machine 120 in 413. Data, which is transmitted from the secure virtual machine 130 to the security service server 20, passes through the host virtual machine 120, and thus is processed by the host operating system. However, the host operating system may only access the encrypted data, such that even when the host operating system is exposed to a hacking attack or a malicious code, security of data may be maintained.

After using a security service, the secure virtual machine 130 ends the secure application being executed, and a security session ends in 414. Then, the virtual machine monitor portion 110 converts the state of the secure virtual machine, where the secure application ends, to an idle state in 415. The secure virtual machine 130 is activated to operate only in the secure execution environment upon the start of the security session, and in the general execution environment, the secure virtual machine 130 is converted into an idle state to minimize use of system resources and prevent system performance deterioration. Upon the end of the security session in the secure virtual machine 130, the host virtual machine 120 and the security service server 20 mutually confirms the end of the security session, and ends the security service in 416.

Figure 5:
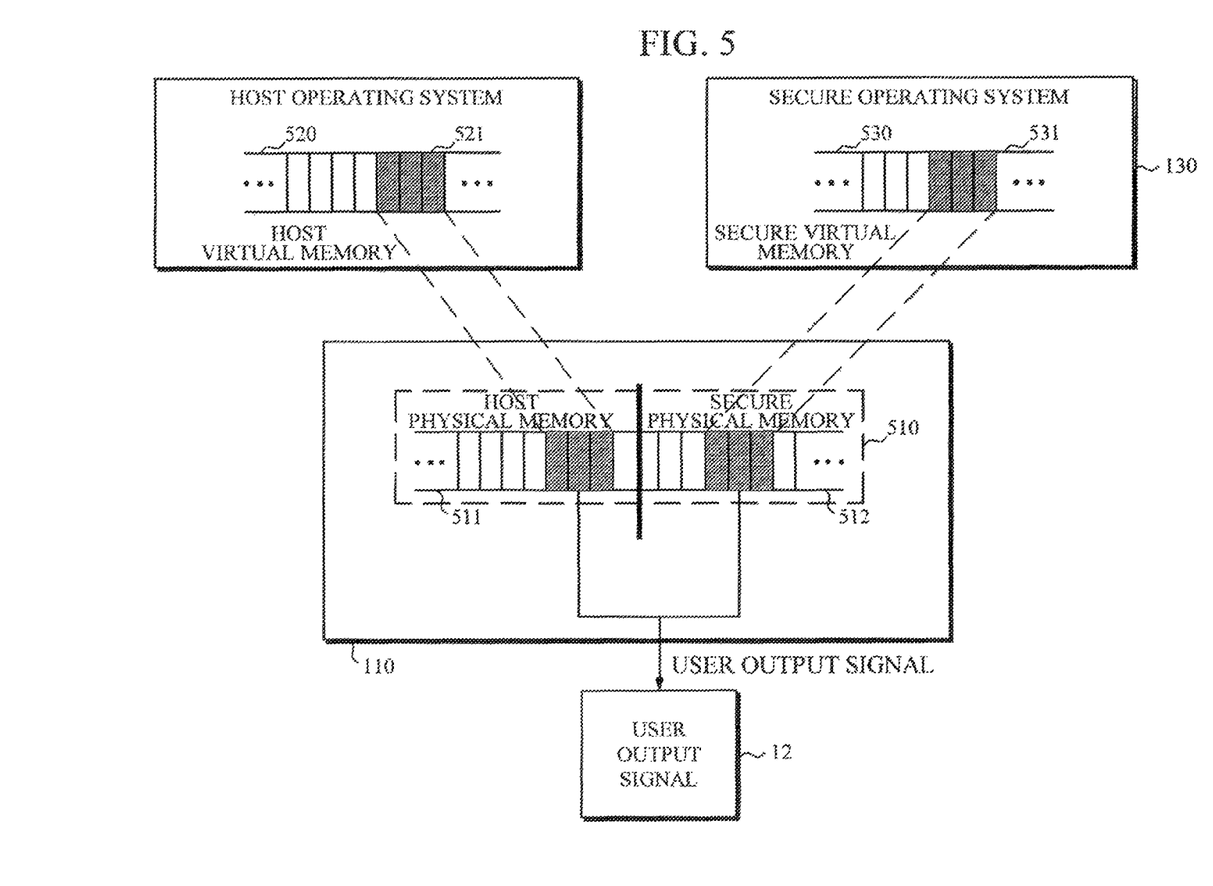
FIG. 5 is a diagram explaining classification of a user's input and output signals by the apparatus for providing security services based on virtualization according to an embodiment.

FIG. 5 is a diagram explaining classification of a user's input and output signals by the apparatus for providing security services based on virtualization according to an embodiment.

Referring to FIGS. 2 and 5, once an event is generated by a user input device (e.g., keyboard, touchscreen interface, etc.) included in the user I/O device 10, the virtual machine monitor portion 110 of the apparatus 100 for providing security services based on virtualization classifies received user input signals into secure and general data, and transmits the classified data to the secure virtual machine 130 and the host virtual machine 120. In the case where the user input signal is received while the secure operating system is activated, the virtual machine monitor portion 110 does not transmit the signal (event) to the host operating system.

The virtual machine monitor portion 110 allocates system resources to generate the host virtual machine 120 and the secure virtual machine by using virtualization. During the virtualization, the virtual machine monitor portion 110 divides a physical memory area 510 into a host physical memory area 511 and a secure physical memory area 512, and allocates the divided memory areas. The host physical memory area 511 and the secure physical memory area 512, which are separately allocated, may not access each other.

The host operating system and the secure operating system uses the host virtual memory 520 and the secure virtual memory 530 respectively, by mapping a host virtual memory 520 and a secure virtual memory 530 into the physical memory areas 511 and 512 that are allocated by the virtual machine monitor portion 110. In order to store all the control registers present in the user output device 12, the virtual machine monitor portion 110 separately generates memory areas in the host virtual memory 520 and the secure virtual memory 530 for a virtual user output device, and then performs mapping of the generated memory areas into output device virtual memories 521 and 521 allocated in each virtual machine. Then the virtual machine monitor portion 110 transmits the user output signals, mapped into the host physical memory area 511 and the secure physical memory area 512, to the user output device 12. The user output device 12, included in the user I/O device 10, outputs results for a user, and may be a monitor or a display screen of a mobile terminal. The user output device 12 may output the received user output signal and may provide the signal to a user. That is, output signals, stored in the output device virtual memory 521 allocated to the host virtual memory 520 of the host virtual machine 120 and in the output device virtual memory 531 allocated to the secure virtual memory 530 of the secure virtual machine 130 are mapped into the host physical memory 511 and the secure physical memory 512 which are separated in the virtual machine monitor portion 110, and the mapped signals are transmitted to the user output device 12. In this case, the host operating system of the host virtual machine 120 may not access the user output signals, such that security may be strengthened.

Figure 6:
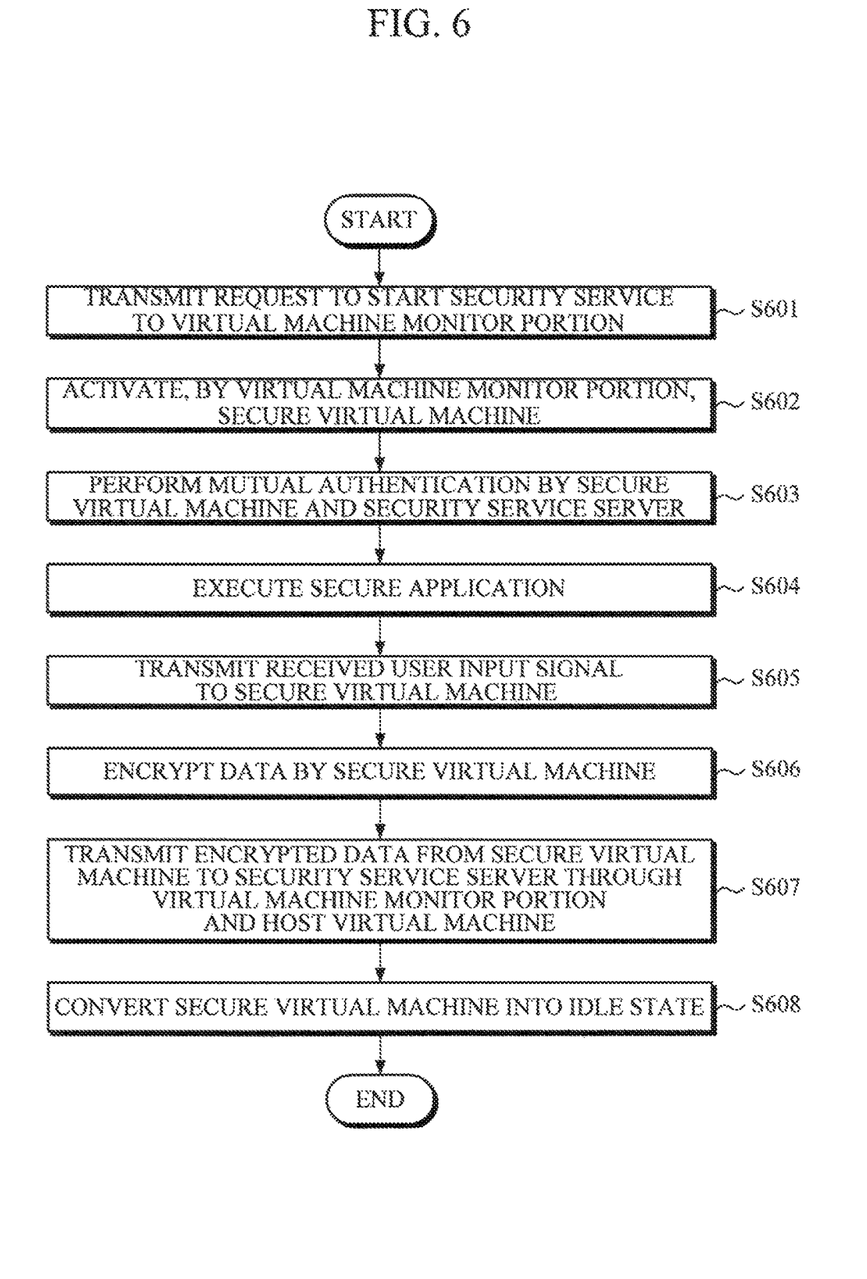
FIG. 6 is a flowchart illustrating a method of providing security services based on virtualization according to an embodiment.

FIG. 6 is a flowchart illustrating a method of providing security services based on virtualization according to an embodiment.

Referring to FIG. 6, the method of providing security services based on virtualization includes: in response to a user's request, transmitting a request to start a security service to the security service server and the virtual machine monitor portion by using a general application executed in the host virtual machine in S601; and the virtual machine monitor portion activates the secure virtual machine in S602. In the general execution environment, only the host operating system of the host virtual machine operates, and the secure virtual machine waits in an idle state to prevent deterioration of system performance. Upon the start of the security service, the virtual machine monitor portion activates the secure virtual machine by scheduling, so that the secure virtual machine may be alternately in a ready state and in a running state, in the same manner as the host virtual machine.

The secure virtual machine, activated by the virtual machine monitor portion, starts a security session, and performs mutual authentication with the security service server by using an authentication module in S603. During the mutual authentication with the security service server, the secure virtual machine is not directly connected with the security service server, but is connected with the security service server through the virtual machine monitor portion and the host virtual machine. The secure operating system of the secure virtual machine transmits authentication information, which is encrypted through an authentication module by using credential information, to the security service server, the receives the encrypted authentication information from the security service server 20 to perform authentication.

Upon the start of authentication, the secure virtual machine executes a secure application in a secure execution environment in S604. Then, the virtual machine monitor portion determines user inputs, received from a user through a secure application, to be secure data, and transmits the inputs to the secure virtual machine in S605. User input signals, received from a user while the secure application is executed (secure execution state), are directly transmitted to the secure virtual machine without passing through the host virtual machine. The user input signals may be information, such as a password, personal information, and card information, which requires security. Upon receiving the user input signals from the virtual machine monitor portion, the secure virtual machine encrypts the data by using an encryption module to generate encrypted data in S606. Then, the secure virtual machine transmits the encrypted data to the security service server through the virtual machine monitor portion and the host virtual machine in S607. The encrypted data, transmitted from the secure virtual machine to the security service server, passes through the host virtual machine, and thus is processed by the host operating system. However, the host operating system may only access the encrypted data, such that even when the host operating system is exposed to a hacking attack or a malicious code, security of data may be maintained.

After using the security service, the secure virtual machine ends the secure application being executed, so that a security session ends, and the virtual machine monitor portion converts the state of the secure virtual machine into an idle state in S608. The secure virtual machine is activated to operate only in the secure execution environment upon the start of the security session, and in the general execution environment where the security session ends, the secure virtual machine is converted into an idle state to minimize use of system resources and prevent deterioration of system performance.

The present disclosure provides an apparatus and method for providing security services based on virtualization, in which a secure operating system is completely isolated from a host operating system, thereby solving a security problem which occurs due to security vulnerabilities of the OS. Specifically, since data, which has not been encrypted, may not be exchanged between two virtual machines where different operating systems operate, reliability of a secure application environment may be guaranteed, and a system may be operated efficiently, regardless of whether a host operating system that operates a terminal is hacked into or is infected with a malicious code. Accordingly, security sensitive services, such as mobile payment, Internet banking, and remote diagnosis, may be provided with improved security and efficiency.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus, the present invention is not limited thereto.

What is claimed is:

1. An apparatus for providing security services based on virtualization, the apparatus comprising:
a host virtual machine in which a host operating system that controls a general execution environment is operated;
a secure virtual machine, which is separated from the host virtual machine, and in which a secure operating system operates independently of the host operating system;

a virtual machine monitor portion configured to allocate the host virtual machine and the secure virtual machine by virtualization; and in response to receiving a user input signal from the virtual machine monitor portion, the secure virtual machine encrypts data to transmit the encrypted data to a security service server by sequentially passing the virtual machine monitor portion and the host virtual machine.

2. The apparatus of claim 1, wherein the host virtual machine and the secure virtual machine access system resources only through the virtual machine monitor portion.

3. The apparatus of claim 1, wherein the virtual machine monitor portion classifies user input signals received from a user, and transmits the received user input signals to the host virtual machine and the secure virtual machine.

4. The apparatus of claim 3, wherein according to focusing of the user input signals or based on whether a secure application of the secure virtual machine is executed, the virtual machine monitor portion transmits the user input signals only to the secure virtual machine.

5. The apparatus of claim 1, wherein upon receiving a security service request from the host virtual machine, the secure virtual machine executes the secure application that requires security and authentication, and encrypts data to transmit the encrypted data to the host virtual machine through the virtual machine monitor portion.

6. The apparatus of claim 1, wherein the host virtual machine transmits the encrypted data, received through the virtual machine monitor portion, to a security service server that provides security services.

7. The apparatus of claim 1, wherein the secure virtual machine executes the secure application in the secure operating system independently of the host operating system, and transmits the encrypted data to an external network through the virtual machine monitor portion and the host virtual machine.

8. The apparatus of claim 1, wherein in the general execution environment where no security service is required, the virtual machine monitor portion converts a state of the secure virtual machine into an idle state, and upon receiving a security service request from the host virtual machine, the virtual machine monitor portion activates the secure virtual machine.

9. The apparatus of claim 1, wherein the virtual machine monitor portion divides a physical memory area into a host physical memory area and a secure physical memory area, and allocates the divided memory areas, wherein the host operating system maps a host virtual memory into the host physical memory area, and the secure operating system maps a secure virtual memory into the secure physical memory area.

10. The apparatus of claim 9, wherein the host operating system and the secure operating system map user output signals of the host virtual memory and the secure virtual memory into the host physical memory area and the secure physical memory area respectively, wherein the virtual machine monitor portion transmits the user output signals, which are mapped into the host physical memory area and the secure physical memory area, to a user output device.

11. A method of providing security services by using a host virtual machine and a secure virtual machine which are operated by a corresponding independent host operating system and secure operating system respectively, the method comprising:

executing a secure application in the secure virtual machine;

based on whether the secure application is executed, transmitting a user input signal, received by a virtual machine monitor portion, to the secure virtual machine, wherein the virtual machine monitor portion being configured to allocate the host virtual machine and the secure virtual machine by virtualization; and transmitting data, encrypted by the secure virtual machine, to a security service server by sequentially passing the virtual machine monitor portion and the host virtual machine.

12. The method of claim 11, further comprising performing mutual authentication between the secure virtual machine and the security service server that provides a security service.

13. The method of claim 11, wherein in a case where the secure application is executed, the virtual machine monitor portion transmits the received user input signal to the secure virtual machine, and in a case where the secure application is not executed, the virtual machine monitor portion transmits the received user input signal to the host virtual machine.

14. The method of claim 11, wherein the secure virtual machine executes secure application in the secure operating system independently of the host operating system, and transmits the encrypted data to an external network through the virtual machine monitor portion and the host virtual machine.

15. The method of claim 11, further comprising:

upon receiving a security service request from the host virtual machine, activating, by the virtual machine monitor portion, the secure virtual machine which is in an idle state; and once a security service ends, converting, by the virtual machine monitor portion, a state of the secure virtual machine into the idle state.

16. The method of claim 11, wherein the virtual machine monitor portion divides a physical memory area into a host physical memory area and a secure physical memory area, and allocates the divided memory areas, wherein the host operating system maps a host virtual memory into the host physical memory area, and the secure operating system maps a secure virtual memory into the secure physical memory area.

17. The method of claim 16, wherein the host operating system and the secure operating system map user output signals of the host virtual memory and the secure virtual memory into the host physical memory area and the secure physical memory area respectively, wherein the virtual machine monitor portion transmits the user output signals, which are mapped into the host physical memory area and the secure physical memory area, to a user output device.

* * * * *